Nov. 1, 1960  F. W. YOUNG  2,958,536
TELESCOPING GROCERY CART HAVING MOVEABLE BOTTOM
Filed Aug. 12, 1957  5 Sheets-Sheet 1

INVENTOR
FRED W YOUNG

BY *Ralph L. Bassett*

ATTORNEY

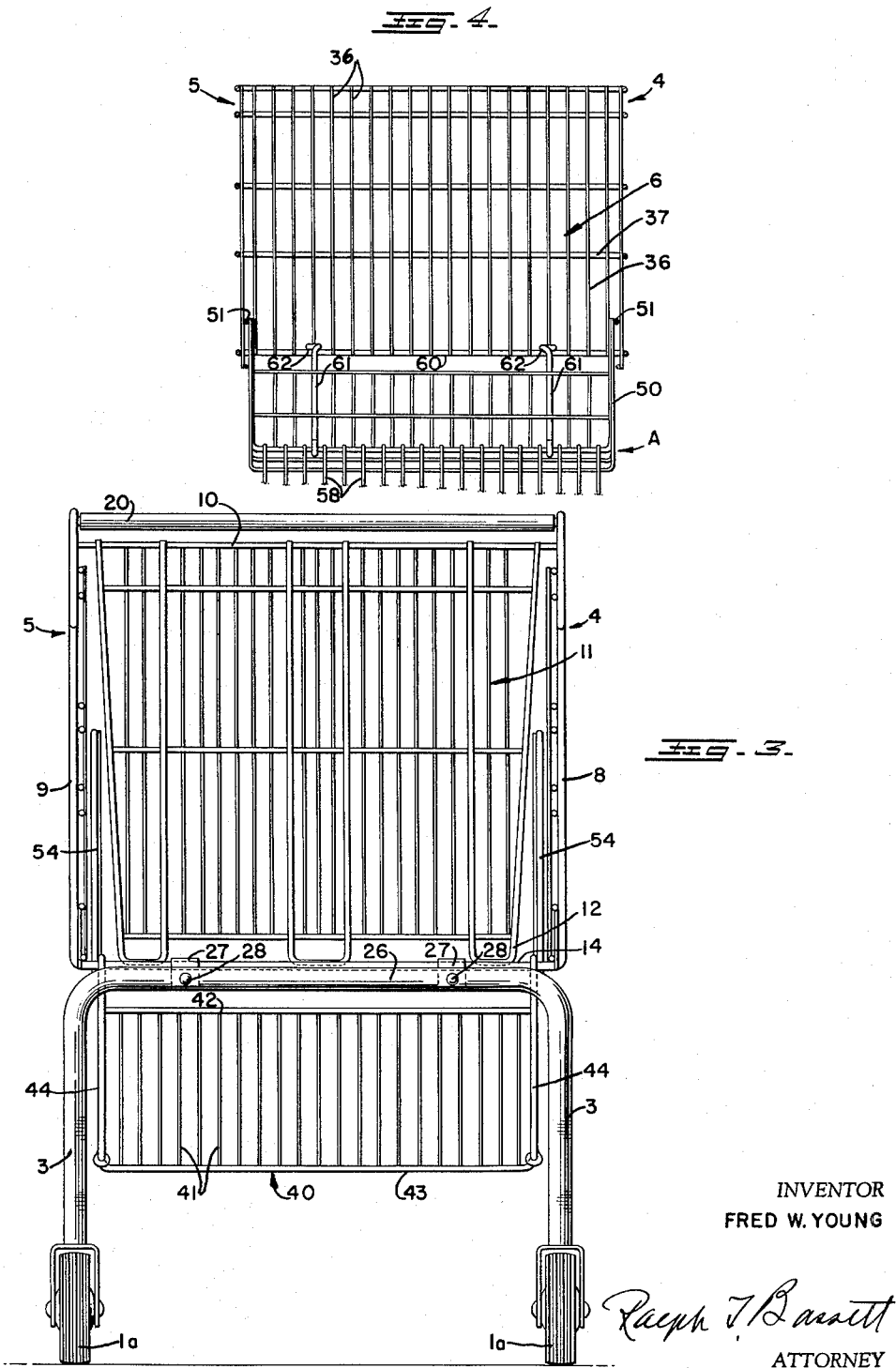

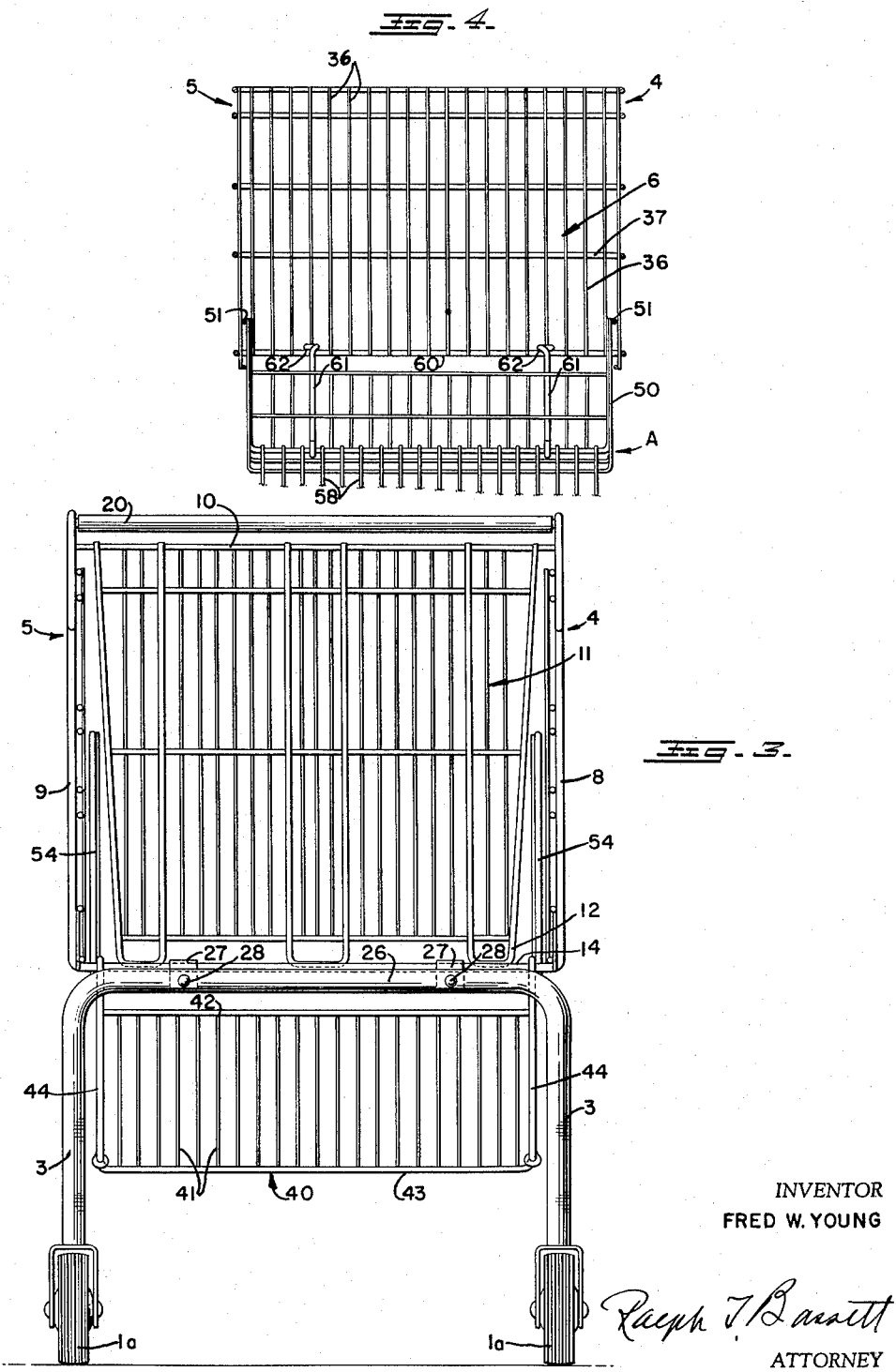

Nov. 1, 1960    F. W. YOUNG    2,958,536
TELESCOPING GROCERY CART HAVING MOVEABLE BOTTOM
Filed Aug. 12, 1957    5 Sheets-Sheet 4
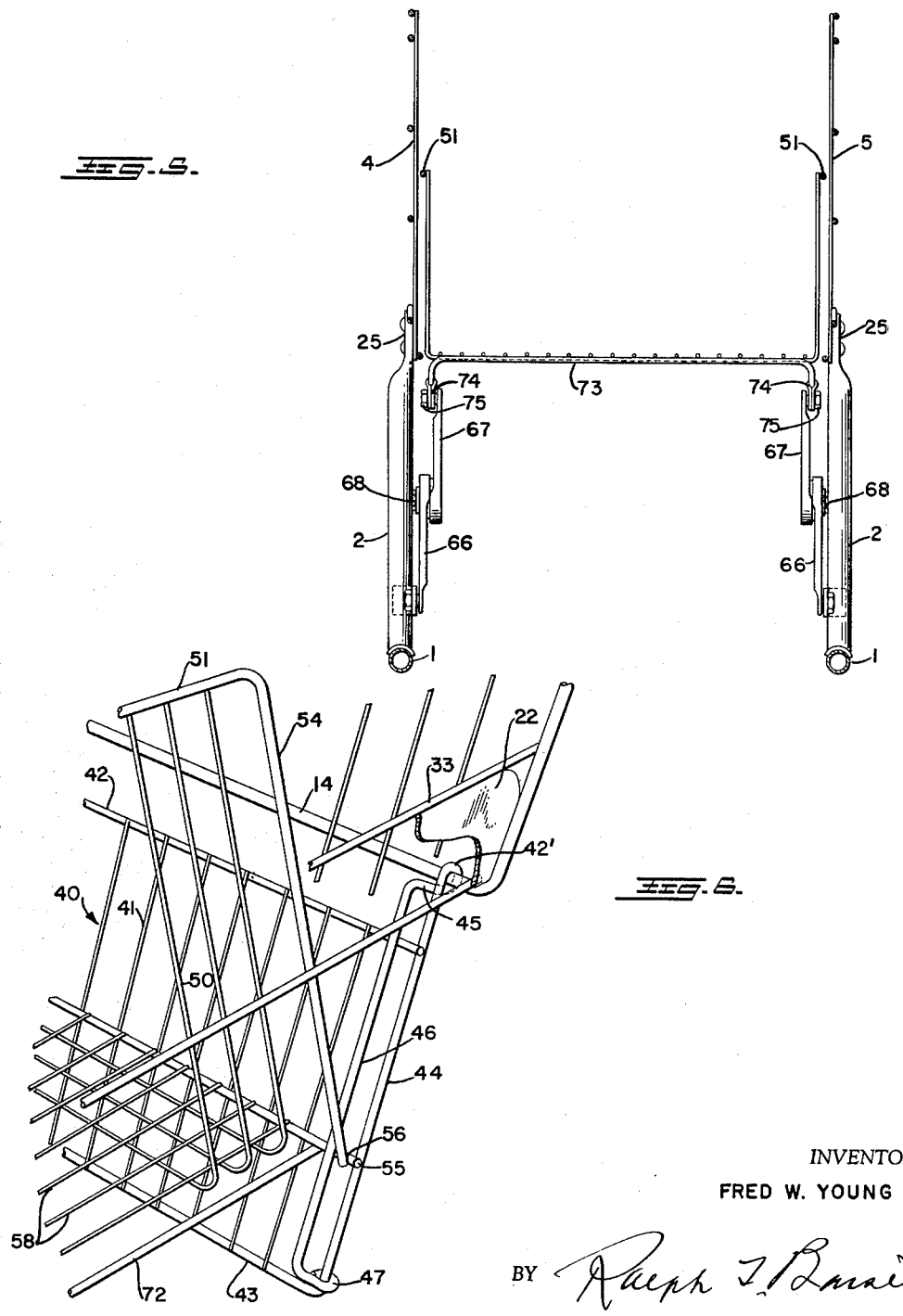
INVENTOR
FRED W. YOUNG
BY
ATTORNEY

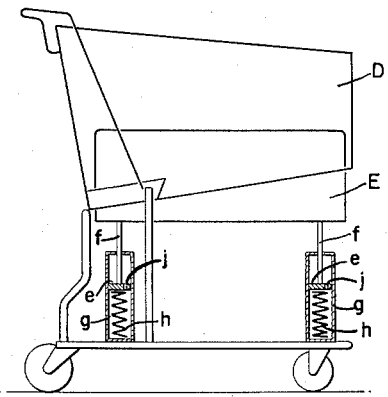
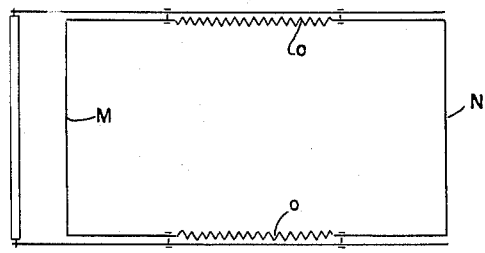
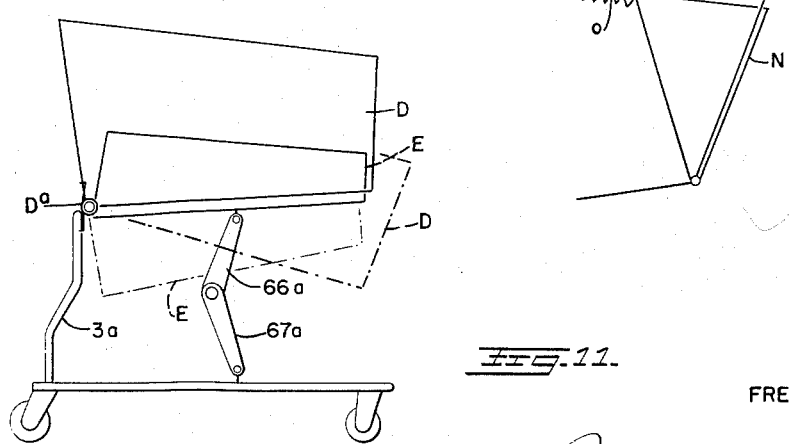

United States Patent Office 2,958,536
Patented Nov. 1, 1960

2,958,536

TELESCOPING GROCERY CART HAVING MOVEABLE BOTTOM

Fred W. Young, Oklahoma City, Okla., assignor to Sylvan N. Goldman, Oklahoma City, Okla.

Filed Aug. 12, 1957, Ser. No. 677,515

8 Claims. (Cl. 280—33.99)

This invention relates to improvements in grocery carts of the telescoping type.

The primary object of this invention is to provide means for increasing the lading capacity of the conventional telescoping cart by the provision of means for moving one or more of the walls of the cart outwardly from the normal lines of the cart structure as the lading is placed therein.

More specifically, the present invention comprehended a basket structure for a telescoping cart in which the bottom structure includes side wall extensions which are telescopically associated with the side walls of the main basket structure so that as the lading is placed on the bottom the capacity of the basket is increased.

This invention further comprehends means for retaining the basket structure assembly, including the sides and bottom, normally between predetermined lines so that one basket will be capable of telescopic association with another basket of a similar cart.

Another feature of the invention is the provision of means in the nature of a motor, spring, fluid or otherwise, which is energized by the loading of the basket so that this motor will function to return the basket to its normal size after the lading is removed therefrom.

These and other objects of the invention will more clearly hereinafter appear by reference to the accompanying drawings forming a part of the instant specification, wherein like characters of reference designate corresponding parts throughout the several views, in which:

Fig. 3 is a rear elevation;

Fig. 4 is a front elevation of the basket shown in Fig. 1 with the bottom in its lower position;

Fig. 5 is a fragmentary elevation showing the position of the spring supporting arms with the bottom of the basket in its retracted position;

Fig. 6 is a fragmentary perspective showing the rear guide for the telescopic bottom;

Fig. 7 shows a modified form of the invention in which a combined spring and fluid motor is used for normally supporting the basket;

Fig. 8 is a top plan view showing a modified form of basket;

Fig. 9 is an end elevation of the invention shown in Fig. 8;

Fig. 11 shows a further modification of the invention.

Figure 1:
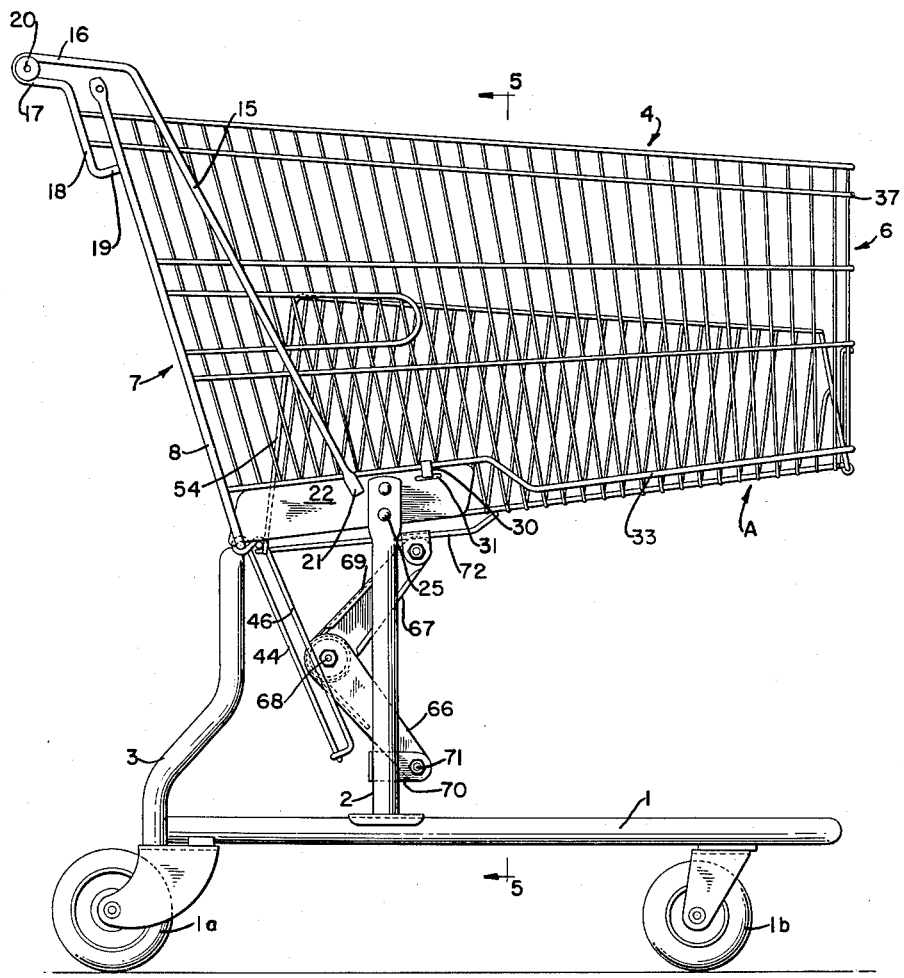
Fig. 1 is a side elevation of the preferred form of the present invention showing the telescoping part in its normally retracted position.

As is conventional in telescoping grocery carts of the present type, there is provided a forwardly converging bottom frame 1 generally of U-shaped form with the side legs each mounting front vertical support 2 and rear support 3, these supports rigidly mounting the main basket structure B which includes side walls 4 and 5 (Fig. 5), front wall 6, and open rear end 7 defined by spaced rearwardly extending upright rods 8 and 9 connected by a cross rod 10 upon which the swinging hinged gate 11 is mounted. This gate 11 swings inwardly during telescopic association with a basket of similar construction, but normally is in its closed position forming the rear wall for the basket with the extensions 12 abutting a cross rod 14 connecting the lower end portions of the rearwardly extending upright frame members 8 and 9. Upwardly and rearwardly inclined braces 15, at each side of the basket, have rearwardly looped extensions 16 with slot portions 17 and downwardly extending braces 18, the extremities of the braces 18 projecting forwardly as at 19 for welded connection with the uprights 8 and 9. A handle member 20 has its extremity mounted in the rearwardly projecting slots 17 and is clamped therein to provide means for the handling of the cart by a customer. The frame 1 is mounted on rear wheels 1a and front casters 1b.

The rear braces 15 have their terminals welded at 21 to the flat plates 22 fixed at the lower rear portions of the outer side walls of the basket structure, these plates 22 tending to brace the side walls and also providing means for connecting the vertical forward supports 2 as shown at 25. It will be noted that the upright front braces 2 are of tubular form and their upper end portions are flattened and secured to the plates 22 by rivets or bolts. The rear upright supports 3 are offset forwardly and their upper ends are connected together in the form of a U-frame, as shown in Fig. 3, the transverse bar 26 connecting the rear uprights 3 and also providing a support for the rear portion of the basket which is clamped thereto by clamps 27 of clip form, these clamps being secured to the cross bar 26 by bolts 28. The side walls 8 and 9 of the basket structure are clipped to the side plates 22 by fastenings 30, these fastenings projecting through the slots 31 in the side plates 22 and being wrapped about the lower longitudinal brace rods 33 at the bottom marginal portions of the side walls 8 and 9 of the basket structure.

The front of the basket 6, as shown in Fig. 4, is generally conventional including a fabricated frame structure formed of upright rods 36 and horizontal cross rods 37, these parts being welded together at points of intersection. The same is true of the side walls and gate, as indicated, these parts all being fabricated of cross rods suitably arranged to provide for containing conventional grocery items, such as found in the usual grocery stores and the like.

Referring now particularly to Fig. 6, it will be seen that the inclined brace rods forming the rear frame elements of the side walls 8 and 9 form part of a U-frame in which the base is at 14. Mounted on the base rod 14 is a depending rear gate extension 40, the function of which is to form a closure for one end of the telescopic bottom structure when the latter is in lower position, as will be more fully hereinafter described. This depending rear gate extension 40 is formed as a fabricated panel including vertical wires 41 connected at their top to transverse wire 42 and at their bottom to a lower cross brace 43. The lower or bottom transverse cross brace 43 has its extremities bent upwardly at 44 to define the end of the gate extension and the upper cross brace 42 is welded thereto. These vertically extending end rods 44 project beyond the cross brace 42 and are wrapped outwardly about the bottom rod 14 and then forwardly as at 45 and then downwardly spaced from, but parallel to, the rod 44 to define a spaced vertically extending guideway. The lower end of the inner rod 46 is bent to loop as at 47 at the junction of the base wire 43 and the upright outer rod 44, the joints being of such a character in all instances as to hold the parts rigidly in their respective positions. By this construction the depending end rear gate extension 40 is suspended by the loop 42' on the rod 14 for swinging movement and at its ends provides the guide slots between the parts 44 and 46 for the movement of the telescopic main basket bottom structure.

Associated with the depending rear gate extension is the telescopic bottom structure indicated at A in Fig. 1. This structure telescopes between the sidewalls 4 and 5 of the main basket assembly and forms the adjustable bottom assembly for the basket assembly. The telescopic bottom structure is fabricated from a plurality of spaced U-shaped wickets 50, the size of the wickets decreasing forwardly to produce a forwardly converging body assembly and the wickets are held at their free ends by longitudinal braces 51, the braces 51 being the arms of a rearwardly diverging wicket structure, the base of which at 51a forms the front upper brace, while the other ends of these braces 51 are bent downwardly as at 54 to provide the inner end frame member. The end members 54 terminate at the cross brace 55 of the bottom wall structure and are welded thereto at 56. The terminals of the cross bar 55 extend at each end between the guideways defined by the members 44 and 46 of the depending gate extension structure.

The bottom of the basket includes longitudinal frame members 58 which are connected together by the base of the U-shaped wickets 50. The side walls of the telescopic bottom A are positioned between the side walls 4 and 5 of the main basket structure and are adapted to move upwardly therein with the inner wall of the basket acting as a guide for these side walls. The front portion of the U-shaped basket member A is suspended from the cross bar 60 of the front of the basket by hangers 61, the upper ends 62 of which are looped about one of the upright frame members 36 of the basket front, while the bottoms are looped about the front transverse bottom frame member of the U-shaped basket member. Normally the U-shaped basket bottom assembly will be positioned between the side walls 4 and 5 of the main basket structure. The floor of the basket bottom will be generally aligned with the bottom of the side walls 4 and 5 during normal conditions and use of the assembly, as shown in Fig. 1.

The U-shaped bottom basket structure is held in its upper telescopic association with the main basket by a toggle structure, this toggle structure including lower arms 66 and upper arms 67 hinged together by hinge pin 68, both of these arms having inwardly projecting marginal flanges 69. The lower arm 66 is clamped to the forward upright 2 adjacent its lower portion by a plate 70 welded to the upright 2 and secured in place by pivot pin 71, while the upper arm 67 is secured to a bottom rail 72 projecting forwardly from the rear of the bottom of the basket. This guide rail 72 is a continuation of one of the cross braces 73 at the bottom of the telescopic basket bottom. The connection of upper arm 67 to the cross rail is by U-clamp 74 positioned on the screw bolt or pin 75. The position of the toggle 66—67 can be adjusted by sliding the clamp 74 forwardly or rearwardly and this clamp can be securely fastened by tightening the pin or nut 75 which is threaded into the upper end of the arm 67.

Figure 10:
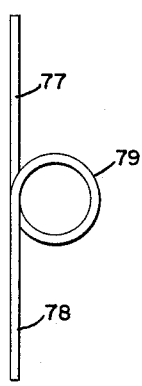
Fig. 10 is an enlarged detail showing the spring construction for the toggle.
Figure 2:
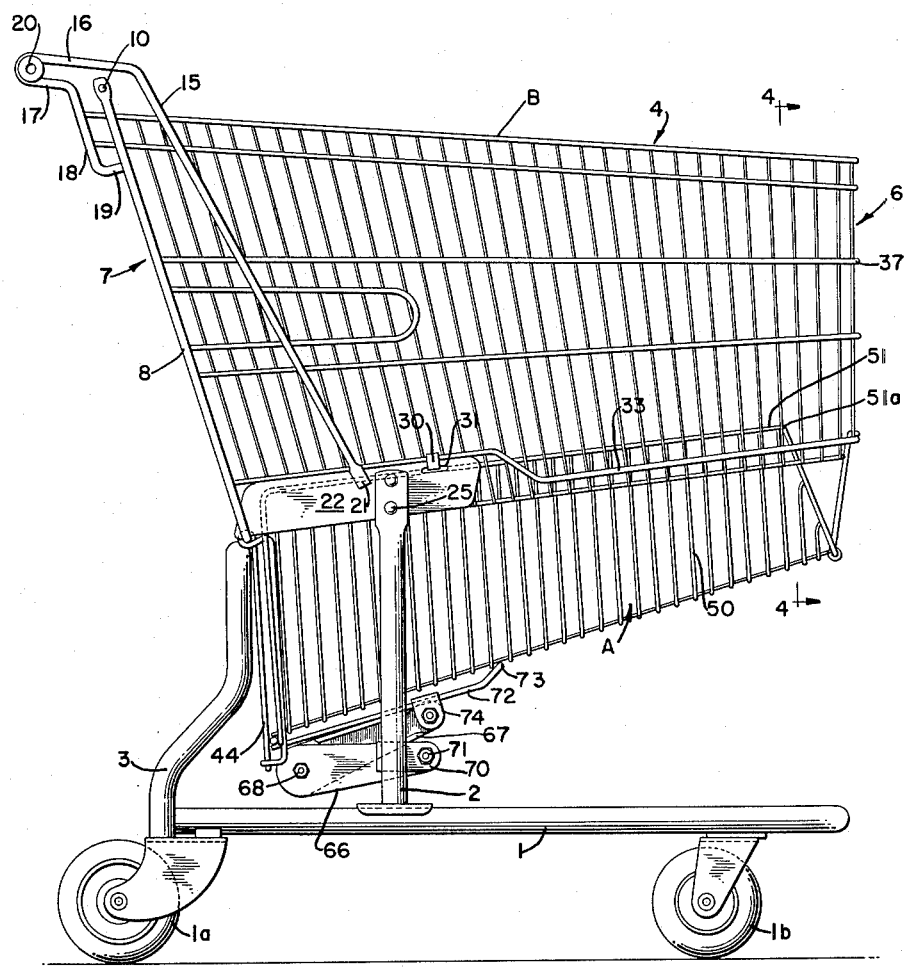
Fig. 2 is a similar view showing the telescoping part extended to the position normally assumed after loading.

Within the toggle arms 66 and 67 is a spring member consisting of an upper spring arm 77 which is positioned beneath the flange 69 of the upper arm 67 and lower spring arm 78 which is positioned beneath a similar flange provided on the rear face of the lower arm 66. The medial coil portion 79 of the spring assembly is positioned about the pivot pin 68 and is contained in a hub structure, as shown in Fig. 1. This spring structure may include as many coils as is essential to provide the necessary tension in the arm 77—78 and normally tends to expand or separate the arms 66—67 and to thereby lift the U-shaped telescopic basket bottom vertically to the position of Fig. 1. When the basket is being loaded the load will necessarily be on the U-shaped telescopic basket bottom and as the load increases, the spring of Fig. 10 being properly calibrated, the basket bottom will under the weight of the load shift to the lower position shown in Fig. 2. As the load is removed from the basket structure the spring will tend to gradually lift the lading remaining in the basket until it has reached its upper position of Fig. 1. The calibration of the spring of Fig. 10 is important in that this spring will generally not function until there is a load approximating the contents of the main basket within the latter, when it will gradually under the increased load, shift down to its lower position providing increased area for lading.

In Fig. 7 a modified structure is shown. In this structure the main basket is indicated at D with the telescopic U-shaped bottom at E. In this disclosure the piston $e$ are secured by rods $f$ to the bottom of the basket and these pistons are arranged within cylinders $g$ containing fluid. The pistons are normally urged upwardly by springs $h$ within the cylinders and a proper amount of fluid is placed in the cylinders so that under load the bottom basket assembly E will move gradually downwardly against the tension of the springs $h$ with the fluid escaping through small ports $j$ in the pistons. The fluid in the cylinder will balance the structure and will insure slow return of the basket to its initial position as the lading is being removed. It is to be understood that this structure may be used with the structure heretofore described and as a substitute for the spring toggle therein shown.

In Fig. 8 the main basket structure is shown with the end walls M and N telescoping rearwardly and forwardly against the tension of the springs $o$ which connect the same together. Obviously, pressure of lading within the basket will cause these forwardly and rearwardly telescoping walls of the basket to move outwardly providing increased lading area. It is proposed in this structure that the bottom of the forwardly and rearwardly telescoping walls be pivoted at their bottoms and swing outwardly on these pivots, and if desired the telescopic bottom assembly may be included.

Fig. 11 there is a modified form of the invention in which the upper basket D is pivoted to the rear upright frame members 3a by pivot Da and the telescoping bottom of the basket E is supported by the spring actuated toggle arms 66a and 67a. By this arrangement the telescoping bottom E will shift under load as in the preferred form of the invention, while the main basket frame D can be swung on the pivot Da to facilitate the unloading of the cart by a person of short stature.

By the structure shown, described and claimed, it is contemplated that the capacity of the conventional telescoping grocery cart may be substantially increased without inconvenience by permanently modifying the depth of the standard basket structure. In fact, it is contemplated that these basket structures can be modified to include not only the novel form of telescoping bottom but also to include expanding wall structures and the like with the telescoping bottom structure. It is also proposed that means be provided in the structure, as in Fig. 11, to facilitate the unloading of the cart by mounting the basket structure in a manner to permit its lowering when found convenient to do so.

What I claim is:

1. In a telescopic grocery cart construction including a frame, supporting wheels for the frame, a basket structure carried by the frame, said basket structure including forwardly converging side walls and a front wall, a hinged gate forming the rear wall, means for supporting the hinged gate for inward swinging movement upon telescopic association with another cart of similar construction, a pair of downwardly extending spaced guide members hinged to the rear portion of the basket structure and depending therefrom and including generally vertical laterally spaced guide slots, a barrier assembly positioned between said guide members and formed as an integral part thereof, a movable bottom structure including side wall portions for said basket having portions extending into said guide slots for guiding association with said guide members, said barrier assembly forming an end closure for said bottom structure when said bottom structure is in lowered position, and link members supporting the forward end of said bottom on the basket structure.

2. The structure of claim 1 characterized in that the link members have slidable association with the front end of the basket.

3. In a telescopic grocery cart construction including a frame, supporting wheels for the frame, a basket structure carried by the frame, said basket structure including forwardly converging side walls and a front wall, a hinged gate forming the rear wall, means for supporting the hinged gate for inward swinging movement upon telescopic association with another cart of similar construction, guide means at the front and rear of said basket structure, said guide means at the rear of the basket forming a support for a depending barrier and being hinged to the basket structure, a bottom for said basket, said bottom including side wall portions adapted to have telescopic association within the basket structure and within the side walls thereof, means slidably connecting said guide means and said bottom, and means for raising and lowering said bottom for increasing and decreasing the capacity of the basket, said barrier forming an end closure for said bottom when the same is lowered below the basket structure.

4. In a telescopic grocery cart construction including a frame, supporting wheels for the frame, a basket structure carried by the frame, said basket structure including forwardly converging side walls and a front wall, a hinged gate forming the rear wall, means for supporting the hinged gate for inward swinging movement upon telescopic association with another cart of similar construction, guide means at the front and rear of said basket structure, said guide means at the rear of the basket including a swinging depending wall structure below the hinged gate and the guide means at the front of the basket including a portion having slidable engagement with the end wall of said basket structure, a bottom for said basket, said bottom including side wall portions positioned for telescopic association with the side walls of the basket structure, said basket being connected to the lower portion of the sliding guide means at the front of the basket and having sliding engagement with the guide means at the rear of the basket, and means carried by the frame and engaging said bottom for raising and lowering the same for increasing or decreasing the capacity of the basket, said depending wall structure forming an end wall for the bottom of said basket when the latter is moved towards its lower position.

5. The structure of claim 4 characterized in that the means for raising and lowering the bottom of the basket includes a spring actuated toggle assembly normally tending to move said bottom towards its upper position.

6. The structure of claim 4 characterized in that the means for raising and lowering the bottom of the basket includes a spring actuated toggle assembly normally tending to move said bottom towards its upper position, said toggle assembly being adjustably connected to said basket structure at one end.

7. The structure of claim 4 characterized in that the guide means at the rear of the basket including the depending wall structure extends below the guide means at the front of the basket, whereby the length of travel of the bottom of the basket is greater at the rear than at the front thus presenting an upwardly inclined bottom when the same is in lowered position to prevent forward displacement of the lading contained in the grocery cart.

8. In a telescopic grocery cart construction including a frame, supporting wheels for the frame, a basket structure carried by the frame, said basket structure including forwardly converging side walls and a front wall, a hinged gate forming the rear wall, means for supporting the hinged gate for inward swinging movement upon telescopic association with another cart of similar construction, guide means at the front and rear of said basket structure, said guide means at the rear of the basket structure extending below the hinged gate and said front guide means and including a transverse integral barrier, a bottom for the basket, said bottom including side wall portions adapted to have telescopic association with the side walls of the basket, link means slidably and hingedly connecting the basket with the front guide means to permit the same to move downwardly, means connecting the rear of said bottom with the rear guide means permitting its movement downwardly a greater distance than the movement of said bottom on the front guide means to thereby position the bottom with its forward end above its rear end, said bottom when in lowered position having its rear open end abutting said barrier to prevent discharge therefrom, and means arranged below said basket bottom for raising and lowering the bottom for increasing and decreasing the capacity of the basket.

References Cited in the file of this patent

UNITED STATES PATENTS

| | | |
|---|---|---|
| 1,099,073 | Moir | June 2, 1914 |
| 2,284,531 | Miller et al. | May 26, 1942 |
| 2,639,161 | Goldman | May 19, 1953 |
| 2,644,695 | Enders | July 7, 1953 |
| 2,672,218 | Genung | Mar. 16, 1954 |
| 2,727,750 | Noll | Dec. 20, 1955 |
| 2,812,187 | Nicholl et al. | Nov. 5, 1957 |

FOREIGN PATENTS

| | | |
|---|---|---|
| 4,252 of 1894 | Great Britain | Nov. 16, 1894 |